Nov. 25, 1969  R. J. O. BERG  3,479,776
BLADE SHARPENER
Filed Sept. 26, 1966  3 Sheets-Sheet 1

RAYMOND J. O. BERG

Nov. 25, 1969     R. J. O. BERG     3,479,776
BLADE SHARPENER

Filed Sept. 26, 1966     3 Sheets-Sheet 3

RAYMOND J. O. BERG

United States Patent Office 3,479,776
Patented Nov. 25, 1969

3,479,776
BLADE SHARPENER
Raymond J. O. Berg, Rte. 1, Box 93,
Gooselake, Iowa 52750
Filed Sept. 26, 1966, Ser. No. 581,979
Int. Cl. B24b *19/00*
U.S. Cl. 51—249      7 Claims

ABSTRACT OF THE DISCLOSURE

A blade sharpening device for use on a blade rotor supported internally of a housing that includes a carriage supported on the housing for axial movement in respect to the rotor and having a grinding wheel depending into the housing for sharpening blades on the rotor, and a connection between the carriage and rotor for angularly shifting the rotor in response to axial shifting of the carriage.

---

This invention relates to a blade sharpening device and more particularly to a blade sharpening device utilized to sharpen blades of a rotor on a forage harvesting implement.

In the conventional type of forage harvesting implement there is normally a forward crop gathering and harvesting portion that gathers and cuts the standing crop in the field and feeds it rearwardly into a housing supporting a rotor, normally on a transverse axis, that reduces the crop prior to discharge into a blower device. A conventional rotor is one that has a series of angularly spaced peripheral blades that cuts the crop against a fixed cutter bar.

One of the problems that has existed in this type of forage harvester is maintaining the blades of the rotor sharp so that the crop may be properly and efficiently reduced. The average worker or farmer does not have the equipment to sharpen the rotor blades and consequently it is necessary to completely remove the blades from the rotor and housing, bring the blades to a shop having equipment that is capable of sharpening the blades, and then remount the blades on the rotor.

There are several disadvantages in sharpening the blades in this matter. There is the time required to dismount the blades and remount the blades on the rotor. The shop may be unable to sharpen the blades promptly and consequently a lengthy shutdown time may be required. Also, the positioning of the rotor and blades in relation to the fixed cutter bar is very critical and once properly set, it is not desirable to disturb this setting although slight adjustments while in the machine may and are made.

With the above in mind, it is the primary object of the invention to provide a blade sharpening device that may be mounted directly on the rotor housing of the forage harvester and may sharpen the blades without dismounting the blades from the rotor. Specifically it is the object of the invention to provide a device having a frame that is adapted to be mounted on the upper open side of the housing and above the rotor. The frame has a pair of transverse tracks that supports a carriage. On the carriage is a grinding wheel supported on an axis parallel to the rotor axis and having its peripheral edge engaging the edge of a rotor blade. It is desired that the grinding wheel grinds the blade edge as the carriage is moved transversely along the tracks. The blades are normally spiraled about the rotor axis and consequently it is necessary that the rotor be advanced angularly in opposite directions as the carriage travels transversely on the tracks in order for the grinding wheel to constantly maintain contact with the blade. Therefore, as a further object of the invention it is desired to provide structure between the carriage and rotor that advances the rotor in the desired amount as the carriage and grinding wheel is moved transversely.

Other objects and advantages of the invention will become apparent to those skilled in the art as the nature of the invention is better understood from the following description and as shown in the accompanying drawings.

Figure 1:
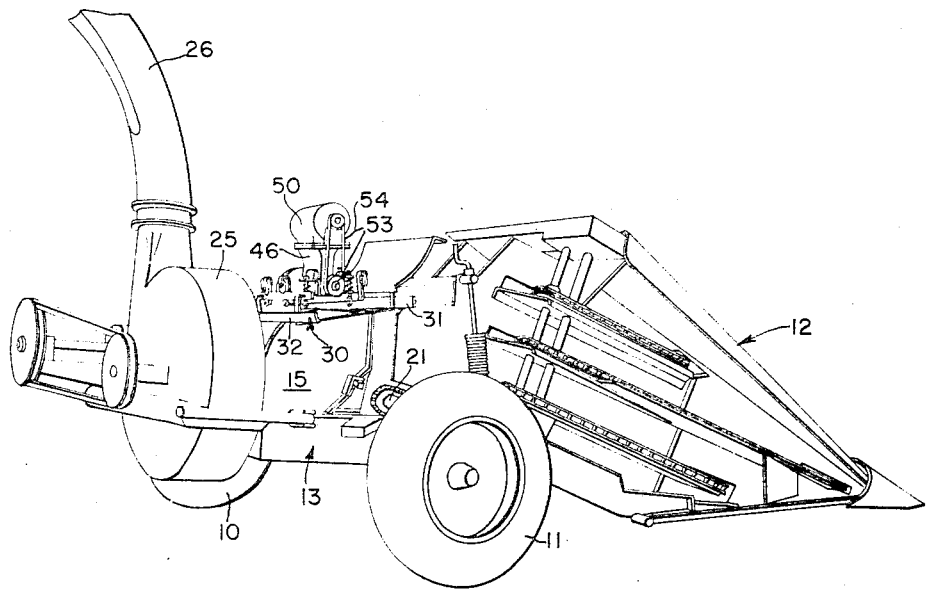
FIG. 1 is a perspective view taken from the rear right side of a forage harvester and having a blade sharpening device supported thereon.

The description of the forage harpester is limited since it is of a conventional type, an example being shown in U.S. Patent 2,651,162, which issued to Whisler Sept. 8, 1953.

Referring now to the drawings, the forage harvest is composed of a transverse main frame carried on a pair of transport wheels 10, 11 that are transversely spaced and support a forwardly extending crop harvester, indicated in its entirety by the reference numeral 12. The harvester illustrated is for harvesting corn primarily. However, other harvester units, such as for hay, may be used. The crop is fed rearwardly from the harvester 12 into a fore and aft extending housing 13 having transversely spaced upright fore and aft extending side walls 14, 15. The housing 13 opens upwardly on its upper side and a cover 16 is hinged to open and close the upper side of the housing.

Supported within the housing 13 is a rotor 20 that has a central transverse horizontal shaft 21 that is journaled on and extends through the respective side walls 14, 15. The rotor 20 includes a pair of hexagonal and radially extending end plates, such as is shown at 22, that are rigid with the shaft 21. Fixed to the edges of the plates 22 are a series of angularly spaced cutting blades 23. The blades are curved and extend helically from one end plate to the other end plate, such being best shown in FIG. 2. The ground surfaces 24 forming the cutting edges on the blades define the outer periphery of the rotor 20. As may best be seen in FIG. 3, the ground surface 24 of the uppermost blade is substantially horizontal.

The blades 23 of the rotor 20 cooperates with a fixed cutting bar, not shown, in the housing 13 that reduces the crops and delivers them rearwardly to a blower mechanism 25 that blows the reduced or chopped crops through a spout 26 to a trailer, also not shown.

The blade sharpening device includes a main rectangular shaped frame 30 that includes a pair of transverse side members 31, 32. The frame 30 is adapted to rest on the upper side of the housing 13 and generally circumscribes the edges of the opening above the rotor 20. It may, if desired, be clamped to the housing, but the weight of the device is such that clamping will not normally be required. Fixed to and extending upwardly from the frame sides 31, 32 and having lateral portions extending toward the center of the opening are angle brackets 33, 34. The inner ends of the brackets carry tracks 35, 36 that project across housing 13.

Wheel brackets 38 support upper and lower guide wheels 39, 40 that engage upper and lower edges of the respective tracks 35, 36. The wheel brackets have lower horizontal portions 41 that project inwardly toward the center of the opening and are rigidly interconnected by fore and aft metal straps 42.

The wheels 39, 40, wheel brackets 38 and straps 40 define a carriage for a subframe 45. The subframe is composed of a central upright pedestal 46 that carries a motor support 47 at its upper end and journal block 48 at its lower end. An electric motor 50 is carried on the support 47 and a transverse grinding wheel shaft 51 is journaled in the block 48. On one end of the shaft 51 is a grinding wheel 52 and on the opposite end is a V-belt pulley 53. A V-belt 54 extends between the motor 50 and pulley 53.

A pair of transversely spaced U-shaped brackets 60 extends under the underside of the block 48 and each bracket 60 has a pair of outwardly projecting flanges 61. The flanges 61 and consequently the entire subframe 45 is suspended on the carriage by means of upright threaded studs 62 that extend through the respective flanges 61 and lower portions 41 of the wheel brackets 38 and opposite ends of the strips 42. Suspension springs 63 are on the studs 62 and bear upwardly against the undersides of the flanges 61. Nut and collars 64 are provided on the studs 62 to bear against the lower ends of the springs and therefore the entire subframe 45 is in fact suspended on the springs or biasing elements 63. Suitable nuts 65 are provided on the studs 62 above and below the brackets 41, 42 so that the effective length of the studs may be adjusted.

Figure 2:
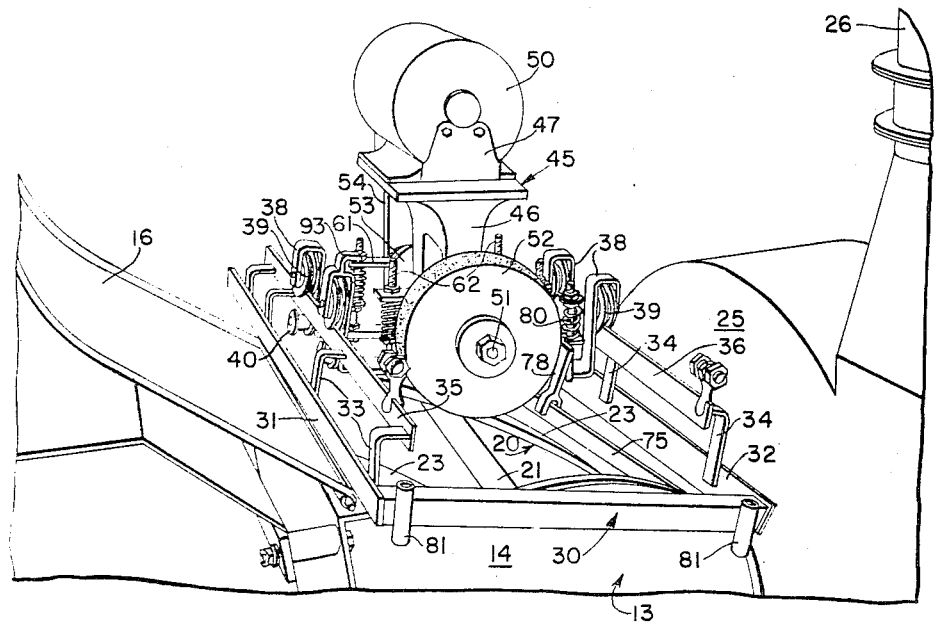
FIG. 2 is a perspective view taken from the left side and showing a portion of the harvester and the blade sharpening device.
Figure 3:
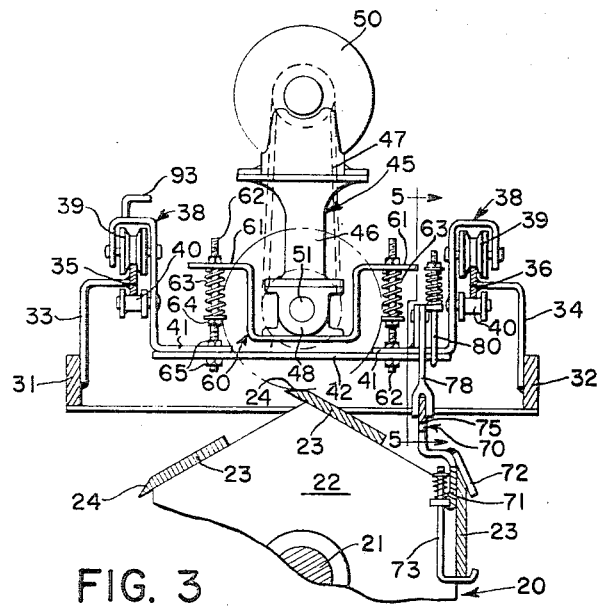
FIG. 3 is a fore and aft vertical sectional view of the blade sharpening device and a portion of the rotor and with the grinding wheel in representative form.
Figure 4:
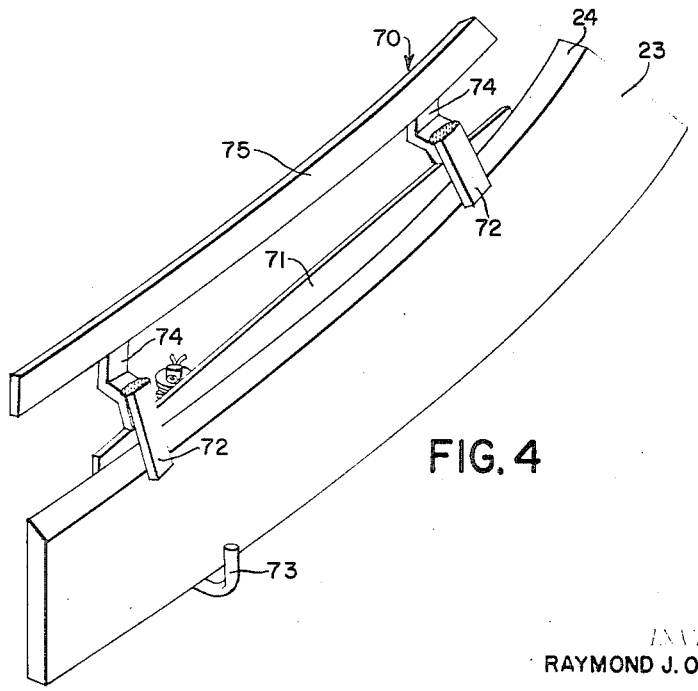
FIG. 4 is an enlarged perspective view of a blade and a fixture portion attached thereto.

As may best be seen from viewing FIGS. 2 and 3, the underside of the grinding wheel is utilized to sharpen the edge 24 of the respective blades 23. It is therefore necessary that the portion of the blade being sharpened be at the uppermost position on the rotor as the wheel 52 is sharpening it. Since the blades are of slight helical shape in respect to the rotor axis, it is therefore necessary that the rotor is turned as the grinding wheel is moved transversely along the tracks 31, 32. To provide such movement there is provided a part of fixture 70 that is adapted for mounting on the rotor blade 23 next adjacent the blade being sharpened. The fixture 70 is composed of a metal plate 71 that lies against the inner side of the respective blade and a pair of transversely spaced lugs 72 fitting over the cutting edges 24 of the blade 23. A spring biased latching element 73 projects downwardly from the plate 71 and hooks under the blade 23 to thereby secure the entire fixture to the blade. The plate 71 also has rigid therewith a pair of upwardly projecting brackets 74 fixed to the underedge of a transverse upright rail 75 that is substantially parallel to the blade 23.

A second part for angularly adjusting the rotor is provided on the carriage and is composed of an L-shaped member 76 having a horizontal portion 77 and a depending vertical portion 78. The member 76 is supported on the carriage for vertical movement on pivot pin 79 extending through a wheel bracket 38. The vertical portion 78 is bifurcated at its lower end to engage and ride on the rail 75. A spring loaded latch element 80 is supported on the horizontal portion 77 and has a lower end adapted to hook under the bracket portions 41, 42 on the other spring bracket 38. The bifurcated end portion 78 is, therefore, always biased downwardly into engagement with the rail 75.

In operation, since the entire carriage is supported and limited only to transverse movement the L-shaped member 76 is also limited to transverse movement. Since the rotor blades must always move in directions having both vertical and fore and aft horizontal components and the rail 75 is trapped by the bifurcated end of the member 76 to move only in accordance with the transverse movement of the carriage and grinding wheel, it obviously follows that the fixture 70 and bracket 74 force the rotor into limited angular movement of the desired amount to place the blade being sharpened at the correct position relative to the grinding wheel in response to the grinding wheel being adjusted transversely.

Figure 6:
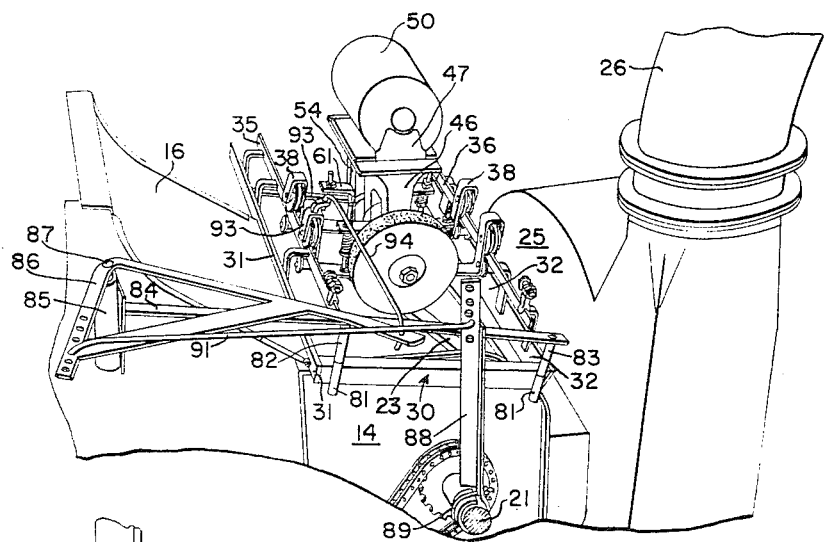
FIG. 6 is a view similar to FIG. 2 showing a modified form of the invention.
Figure 7:
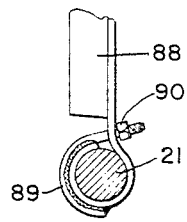
FIG. 7 is an enlarged and end view of the attaching portion of the sharpening device to the rotor shaft.
Figure 5:
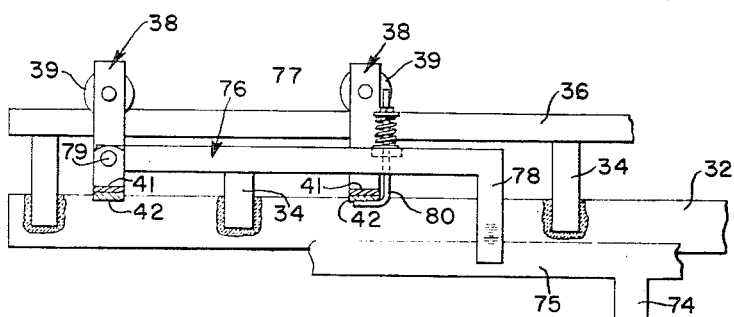
FIG. 5 is an enlarged sectional view taken substantially along the line 5—5 of FIG. 3.

In some instances the rotor is constructed in a manner different than that previously described and as a result the fixture 70 cannot be applied. For such instances a different structure is employed to move the rotor angularly and such is best shown in FIG. 6. The end of the frame 30 is provided with a pair of upright fore and aft spaced tubular sockets 81. Pins 82, 83 have lower ends that sit in the sockets 81. An elongated steel plate 84 is rigid with the upper ends and forms a frame extension therewith that terminates in an upright pivot tube 85. A horizontal bell crank 86 has a depending vertical rod 87 that pivots in the tube 85 so that the bell crank may swivel laterally. Mounted on the rotor shaft 21 is an upright lever 88, of angle iron construction, having a flange formed to partially wrap around the shaft 21. A take up stud 89 is welded to the wraparound portion and extends through the flange above the shaft 21. A nut 90 may be tightened to lock the flange to the shaft. A connecting rod or link 91 extends between one leg of the bell crank 86 and the upper end of the lever 88. Spaced apart openings are provided in both the bell crank and lever to receive opposite ends of the rod 91 so that the effective distance between them may be accurately adjusted and held.

Welded to the forward left-hand wheel carrying bracket 38 is a small upright bracket 93 with a horizontal flange that receives one end of a transverse link or rod 94. The outer end of the rod 94 is connected to the other leg of the bell crank 86. The rod 94 causes swiveling of the bell crank in response to transverse movement of the carriage.

The latter rotor adjusting mechanism operates in the followin manner. As the grinding wheel and its carriage is shifted transversely, it will impart a pushing or pulling action to the rod 94 so as to adjust the bell crank 86 on its upright pivot. This causes the link 91 to effect movement of the lever 88 to slightly rotate the rotor so as to retain the position of the cutting edge of the blade being sharpened directly beneath the grinding wheel 52.

While only two modifications of the invention has been shown, it should be recognized that other forms will occur to those skilled in the art. Therefore, while the preferred forms have been set forth, it should be understood there is no intention to limit or narrow the invention beyond the broad concept set forth in the appended claims.

I claim:

1. A blade sharpening device for use with a forage harvester in which there is crop harvesting mechanism that harvests and delivers crops to a rear fore and aft extending housing with a side opening and a cutting rotor retained within the housing adjacent the side opening, the rotor being composed of a plurality of angularly spaced and substantially parallel peripheral and spiral shaped cutting blades supported on a rotor frame, the sharpening device comprising: a main frame adapted for support on the housing adjacent the opening; track means supported on the main frame and disposed parallel to the rotor axis; a carriage supported on the track means for movement parallel to the rotor axis; a blade sharpening tool on the carriage adapted to engage a blade; a lever fixed to the rotor and disposed radially in respect to the rotor axis; and linkage means extending between the carriage and lever for effective angular adjustment of the rotor as the carriage moves along the track means to thereby angularly position the blade into alignment with the sharpening tool as the tool and carriage advances along the track means.

2. The structure as set forth in claim 1 further characterized by the sharpening tool being a grinding wheel rotatable about an axis parallel to the rotor axis and having its outer edge engageable with the edge of the respective blade.

3. The structure as set forth in claim 1 in which the housing is a fore and aft extending housing with its side opening in the top side of the housing, and the sharpening tool is a grinding wheel suspended on the carriage to project into the housing to contact the blade edge of the blade on the upper side of the rotor.

4. The structure as set forth in claim 3 in which the grinding wheel is carried on a subframe and has a drive motor associated therewith also carried on the subframe, and the subframe is supported on the carriage by yieldable suspension means adapted to counteract the weight of the motor, subframe, and wheel whereby the wheel will engage the respective blade with a comparatively light downward pressure.

5. The structure as set forth in claim 4 in which the track means is a pair of parallel tracks disposed transversely to the housing, the carriage is supported on wheels adapted to roll along the tracks; and the suspension means are four upright spring structures that bear downwardly on the carriage and engage the underside of four corners of the subframe.

6. The structure as set forth in claim 1 in which the linkage means includes a bell crank pivotally supported on the main frame; a link extending between the carriage and one part of the bell crank; and a link extending between the lever and a second part of the bell crank.

7. A blade shapening device for use with a forage harvester in which there is crop harvesting mechanism that harvests and delivers crops to a rear fore and aft extending housing with an opening in its top side and a transverse cutting rotor retained within the housing beneath the opening, the rotor being composed of a plurality of angularly spaced and substantially parallel peripheral cutting blades supported on a rotor frame, the sharpening device comprising: a main frame adapted for support on top of the housing above the opening; transverse track means supported on the main frame and disposed parallel to the rotor axis; a carriage supported on the track means for movement parallel to the rotor axis; a blade sharpening tool supported on the carriage and depending through the opening to engage a blade; a radial arm on the rotor; and a linkage means between the arm and carriage for angularly moving the rotor in response to axial movement of the carriage.

References Cited

UNITED STATES PATENTS

| | | | |
|---|---|---|---|
| 636,540 | 11/1899 | Louden. | |
| 2,574,110 | 11/1951 | Kopec | 51—95 XR |
| 983,850 | 2/1911 | Whipple | 51—249 |
| 1,807,975 | 6/1931 | Eyres | 51—249 X |
| 1,968,609 | 7/1934 | Madsen | 51—249 X |
| 2,476,177 | 7/1949 | Bloom | 146—117 |

HAROLD D. WHITEHEAD, Primary Examiner

U.S. Cl. X.R.

146—117